United States Patent [19]

Schaefer et al.

[11] Patent Number: 4,542,433

[45] Date of Patent: Sep. 17, 1985

[54] MISSING PHASE DETECTOR

[75] Inventors: Martin A. Schaefer, St. Petersburg; David J. Sawayda, Clearwater, both of Fla.

[73] Assignee: Sperry Corporation, New York, N.Y.

[21] Appl. No.: 528,505

[22] Filed: Sep. 1, 1983

[51] Int. Cl.$^4$ ............................................. H02H 3/24
[52] U.S. Cl. ....................................... 361/92; 361/76; 340/663; 307/127
[58] Field of Search ....................... 361/92, 77, 76, 33, 361/85, 88, 90, 42, 47–50; 340/660, 658, 661, 662, 663; 307/127

[56] References Cited

U.S. PATENT DOCUMENTS 3,286,129 11/1966 Gagniere ............................ 361/47
3,401,308 9/1968 Darke ................................. 361/76
4,099,215 7/1978 Parrier et al. .................. 361/47 X Primary Examiner—Patrick R. Salce
Attorney, Agent, or Firm—Howard P. Terry; Seymour Levine

[57] ABSTRACT

A multiphase imbalance monitor utilizes a resistive summing network for sampling the ac voltage in each phase of the system under consideration. The summing network provides a zero voltage output under normal conditions. When a phase imbalance or missing phase condition occurs, the summing network provides a finite output voltage which can be used to actuate indicating and/or interrupting means.

5 Claims, 1 Drawing Figure

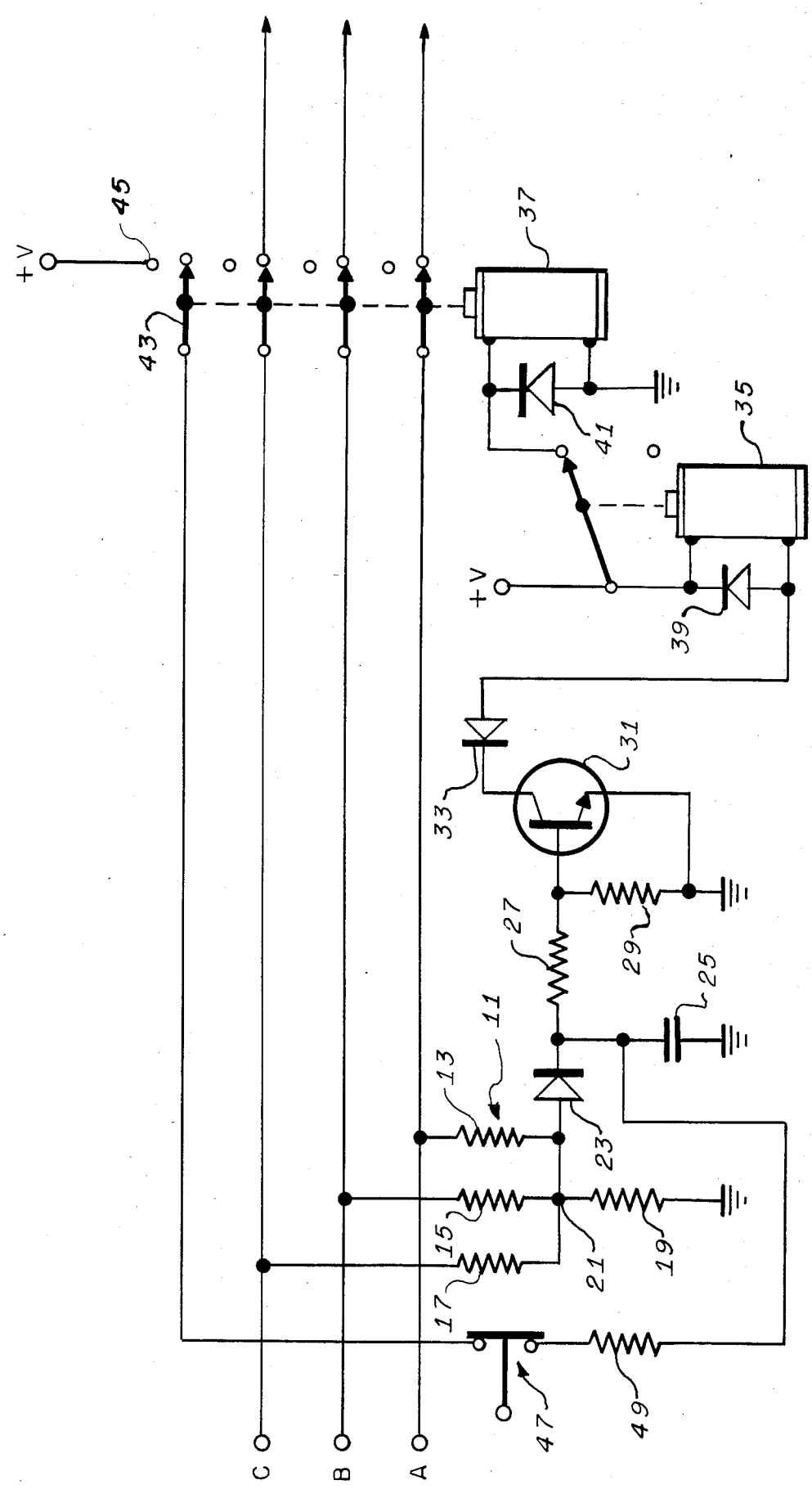

MISSING PHASE DETECTOR

BACKGROUND OF THE INVENTION

1. Field of the Invention

The present invention relates to electrical power monitors and more specifically to monitors for detecting phase imbalances in a multiphase electrical system.

2. Description of the Prior Art

Monitors for detecting unbalanced or missing phase voltages in multiphase electrical power transmission systems are known in the art.

Typically, these prior art devices monitor each phase independently. The ac voltage for each phase is either averaged or peak-detected and then divided down to a level suitable for application to a solid state logic circuit usually including an AND circuit that will respond to a missing or abnormal phase voltage, and an indicating means responsive to the output of the AND circuit.

Since such prior art devices require that each phase be monitored separately, such prior art devices must include individual means to average or peak-detect each phase and individual means to reduce each phase voltage to a level suitable for processing in the logic and indicating circuits. Furthermore such prior art circuits require considerable modification if the device is to be used in conjunction with systems having a different number of phases or a different voltage level than the system for which the monitor was originally designed.

As opposed to such prior art devices the device of the present invention requires relatively few components, draws a minimum of power during normal operation, and can be readily adjusted to monitor conditions in multiphase systems of substantially any voltage or number of phases.

SUMMARY OF THE INVENTION

The individual voltages of each phase in a multiphase system are simultaneously applied to a summing network. Under normal operating conditions, the output voltage of the summing network is zero. An imbalance in the phase voltage provides a finite voltage at the summing junction which can be utilized by indicating or system interruption means.

BRIEF DESCRIPTION OF THE DRAWING

The sole FIGURE is a diagram illustrating the structure and principles of operation of the invention.

DESCRIPTION OF THE PREFERRED EMBODIMENT

The sole FIGURE illustrates the circuit of the invention operating in a typical environment including a three phase transmission line system containing individual lines A, B, and C.

A summing network 11 contains sampling resistors 13, 15, and 17 connected to the transmission lines A, B, and C, respectively, and a bias resistor 19 connected to the summing junction 21 to which the three sampling resistors are connected. A diode 23 is connected to the summing junction 21 and to ground through a capacitor 25 to form a peak detector as will be explained. Voltages appearing at the junction of the diode 23 and the capacitor 25 are applied to a solid state switching means comprising the resistors 27 and 29 and a transistor 31 which is normally in the cut-off condition in the absence of a voltage appearing at the summing junction. The switching transistor is coupled through a diode 33 and a relay 35 to a positive voltage source V. The relay 35 is normally in the un-energized condition in which it couples the voltage from the source V to a second normally energized circuit interrupting relay 37.

Typically diodes 39 and 41 are coupled across the coils of the relays 35 and 37 to shunt any spurius voltage spikes around these coils.

As depicted in the FIGURE, the circuit interrupting relay contains a wiper arm for each transmission line and a wiper arm 43 having its back contact 45 connected to the source of positive voltage.

The wiper arm 43 serves to couple the voltage V through a reset switch 47 and a series resistor 49 to the peak detector and the input of the transistor 31 when the relay 37 is deenergized.

During normal operation each of the phase voltages A, B, and C are equal and as is known in the art, have a vector sum of zero volts. Therefore under these conditions, the voltage at the summing junction will be zero. The switching transistor will be in the cut-off condition so that the relay 35 will be de-energized thus permitting the voltage V to be applied to the circuit interrupting relay 37 so as to maintain continuity in the transmission lines A, B, and C.

Assume now that the phases A, B, and C become unbalanced. An AC voltage will appear at summing junction 21, permitting the capacitor 25 to charge through the diode 23 to a peak positive value essentially equal to the value of the peak voltage appearing at the junction 21 minus the voltage drop occuring across the diode. Resistor 27 limits the current flow to the base of the transistor, but permits the transistor to be driven to saturation. The resistor 29 provides a path to ground so that charge will not be stored on the transistor base.

When the transistor is driven into saturation, current flows from the source V through the coil of the relay 35 opening this relay and de-energizing the circuit interrupting relay 37. When the relay 37 is de-energized, the three phase lines are opended thus interrupting current flow in the lines being monitored. At the same time, relay wiper arm 43 is brought into contact with terminal 45 permitting the voltage V to be applied through the reset switch 47 and the current limiting resistor 49 to the solid state switching means thus permitting the transistor to remain in the conductive state until any fault has been corrected and the reset button is pushed in order to resume operation.

It will be appreciated that the crucial part of the circuit is the summing network comprising the sampling resistors 13, 15, 17, and the biasing resistor 19. The resistors 13, 15, and 17 will be of equal value whereas the value of the resistor 19 will be much less than the resistance of the resistors 13, 15, and 17 in parallel so that the greater portion of the voltage drop will occur across the sampling resistors when a missing or unbalanced phase condition occurs. The relative value of the sampling and bias resistors can be adjusted to provide a saturating voltage to the solid state switching means when a specified threshold of imbalance occurs. Thus the circuit may be adapted to accommodate various voltage levels merely by adjusting the value of the biasing resistor 19.

It will also be appreciated that the circuit can be readily adapted to monitor multiphase systems other than the illustrated three phase system by providing a sampling resistor for each phase in the system and providing a circuit interrupting relay with a wiper arm for each phase in the system to be monitored.

Furthermore it should be noted that although a specific solid state switching means and circuit interrupting means has been illustrated, instances may occur where the system need not be interrupted, but only a visual or audible indication need be provided. In such instances, the relays could be eliminated and the switching means could be utilized to drive the indicator device in a straightforward fashion.

Similarly the resetting means could be eliminated or modified if so desired without departing from the spirit of the invention.

Since the circuit of the invention monitors all phases of a system simultaneously through a single summing circuit it requires the use of relatively few elements. Furthermore, these elements are standard off-the-shelf items which provide a much simpler easily modified and readily repairable circuit.

While the invention has been described in its preferred embodiments, it is to be understood that the words which have been used are words of description rather than of limitations and that changes within the purview of the appended claims may be made without departing from the true scope and spirit of the invention in its broader aspects.

We claim:

1. An unbalance protection apparatus for a multiple transmission line, multiphase electrical transmission system comprising:
    means for providing a signal voltage representative of a vector sum of voltages on individual transmission line of said multiphase electrical transmission system;
    means for providing a voltage source;
    a first relay having a coil and a wiper arm coupled at a first end to said voltage source means and in movable contact at a second end between first and second terminals;
    switch means coupled in series with said voltage source and said coil of said first relay and switchable between current conductive and nonconductive states in response to said signal voltage for energizing and deenergizing said coil of said first relay such that said wiper arm is movably coupled to said first and second terminals in response to said current conductive and non-conductive states;
    a second relay having a coil coupled to said first terminal of said first relay, a multiplicity of wiper arms respectively coupled in said transmission lines to control current flow in said transmission lines in response to terminal contact positions of said wiper arm of first relay, and having at least one wiper arm with one end coupled to said switch means and a second end contact movable between two terminals in response to said terminal contact positions of said wiper arm of said first relay, one of said two terminals being coupled to said voltage source means, whereby once said signal voltage exceeds a predetermined threshold, causing a responsive state for said switch means and thereby actions of said first and second relays to place said at least one wiper arm of said second relay in contact with said one terminal coupled to said voltage source means, said switch means remains in said signal voltage responsive state; and
    reset means coupled between said at least one wiper arm of said second relay and said switch means for resetting said switch means to a pre-signal voltage responsive state.

2. The protection apparatus of claim 1 wherein said means for providing said signal voltage includes;
    resistors correspondingly coupled between each transmission line of said multiphase electrical transmission system and a common junction point; and
    a bias resistor coupled between said common junction point and ground, whereacross said signal voltage is developed.

3. The protection apparatus of claim 1 wherein said switch means includes a switching transistor coupled to energize said first relay means in response to said signal voltage.

4. The protection apparatus of claim 3 further characterized in that said transistor is normally biased to cut off but arranged to be driven to saturation when said signal voltage achieves a magnitude that exceeds a specified threshold.

5. The protection apparatus of claim 3 further including:
    a rectifier having a first terminal coupled to receive said signal voltage and a second terminal coupled to said transistor; and
    a capacitor coupled between said second terminal of said rectifier and ground, said rectifier and said capacitor cooperating to provide a d.c. signal representative of peak values of said signal voltage whereby said transistor is in said conductive state when said d.c. signal exceeds a specified threshold.

* * * * *